BEST AVAILABLE COPY
Oct. 3, 1933. S. S. DAUMAN Des. Re. 18,960
LIGHTING UNIT OR ARTICLE OF ANALOGOUS NATURE of Orig. 90,134
Original Filed March 14, 1933
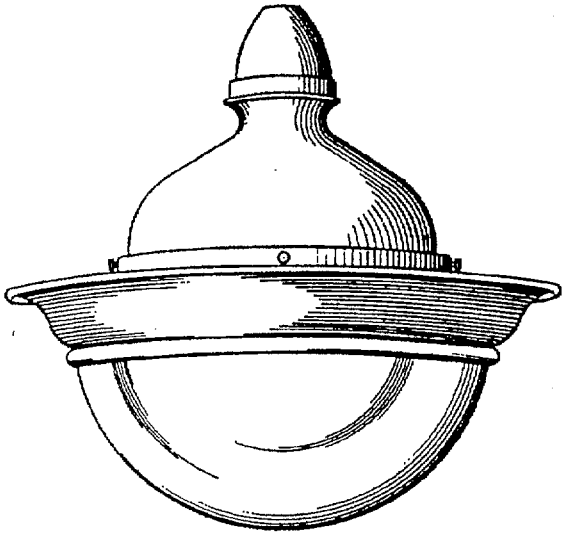
INVENTOR
Samuel A. Dauman
BY
John M. Cole,
ATTORNEY Patented Oct. 3, 1933

BEST AVAILABLE COPY

Des. Re. 18,960

UNITED STATES PATENT OFFICE

Des. Re. 18,960

DESIGN FOR A LIGHTING UNIT OR ARTICLE OF ANALOGOUS NATURE

Samuel S. Dauman, New York, N. Y.

Original No. 90,134, dated June 13, 1933, Serial No. 47,447, March 14, 1933, for 3½ years. Application for reissue August 1, 1933. Serial No. 48,906. Term of patent 14 years

*To all whom it may concern:*

Be it known that I, SAMUEL S. DAUMAN, a citizen of the United States of America, and a resident of New York, in the county of Bronx and State of New York, have invented a new, original, and ornamental Design for a Lighting Unit or Article of Analogous Nature, of which the following is a specification, reference being had to the accompanying drawing forming a part thereof.

The single figure of the drawing is a perspective view of the lighting unit or article of analogous nature, which is characterized by a lower diffusing bowl, an upper dome shaped reflector and an intermediate opaque band, the entire unit being symmetrical about a vertical axis.

I claim:

The ornamental design for a lighting unit or article of analogous nature, substantially as shown and described.

SAMUEL S. DAUMAN.